E. K. BAKER.
DEMOUNTABLE RIM FOR AUTOMOBILE WHEELS.
APPLICATION FILED MAR. 10, 1914.
1,100,816.
Patented June 23, 1914.
2 SHEETS—SHEET 1.
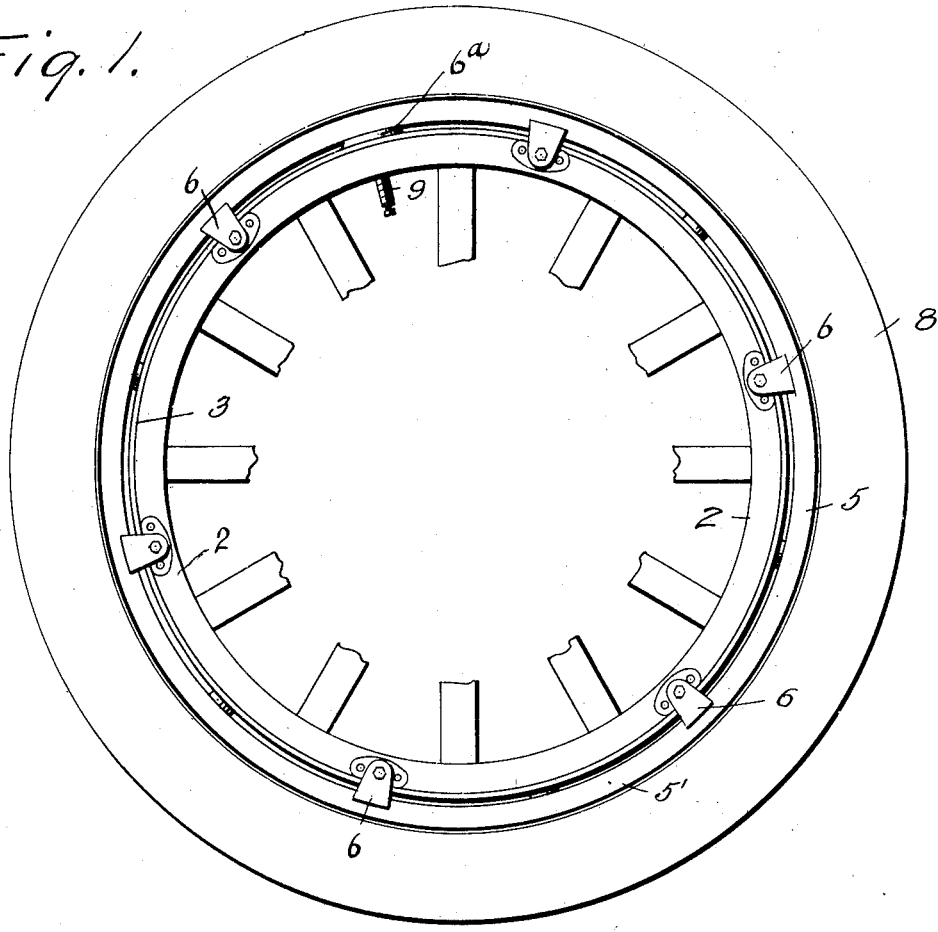
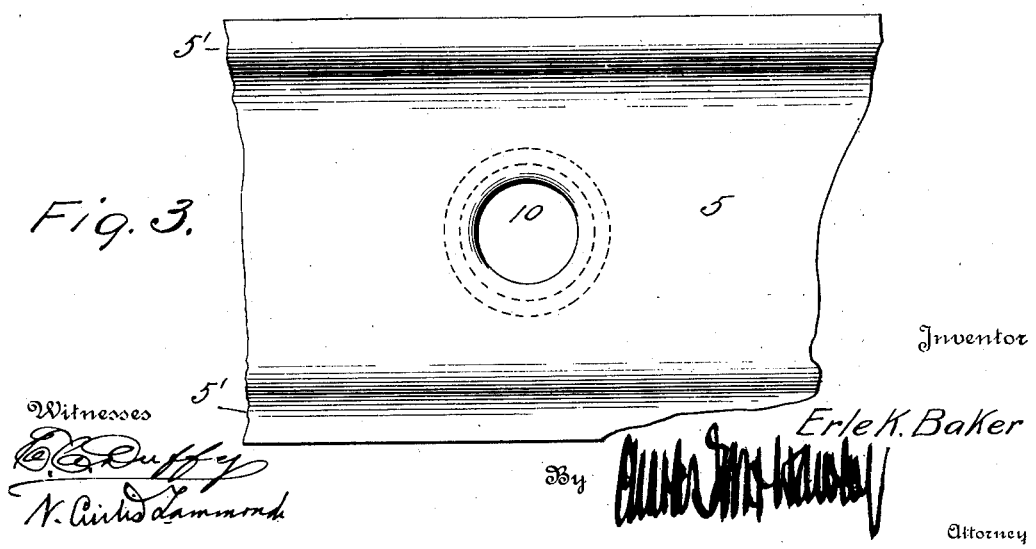
Inventor
Erle K. Baker
Witnesses
By
Attorney

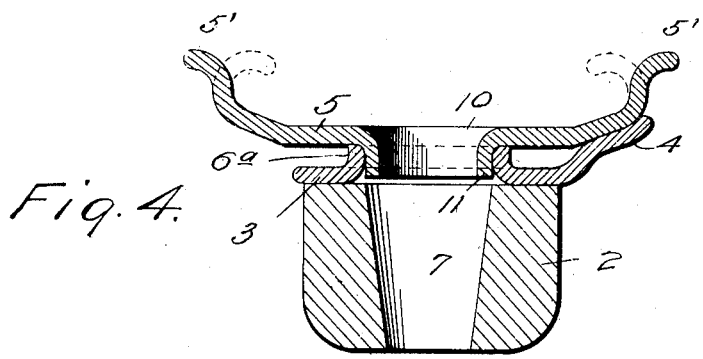
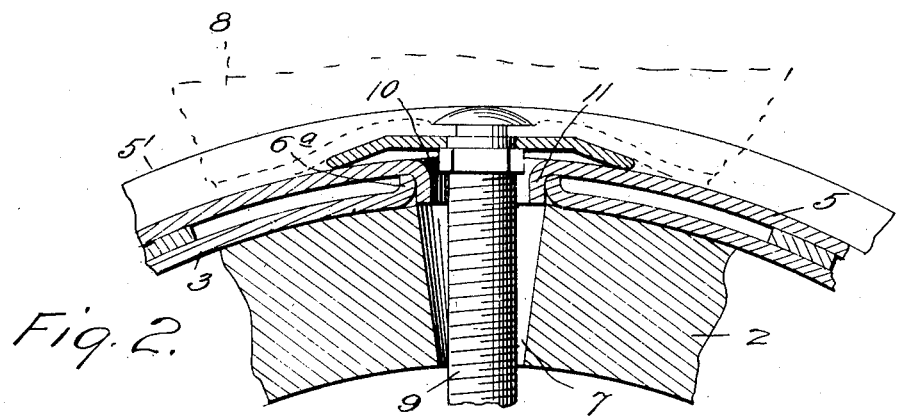

UNITED STATES PATENT OFFICE.

ERLE K. BAKER, OF CHICAGO, ILLINOIS, ASSIGNOR TO UNIVERSAL RIM COMPANY, OF CHICAGO, ILLINOIS, A CORPORATION OF ILLINOIS.

DEMOUNTABLE RIM FOR AUTOMOBILE-WHEELS.

1,100,816. Specification of Letters Patent. Patented June 23, 1914.

Application filed March 10, 1914. Serial No. 823,807.

*To all whom it may concern:*

Be it known that I, ERLE K. BAKER, a citizen of the United States, and a resident of Chicago, county of Cook, and State of Illinois, have invented certain new and useful Improvements in Demountable Rims for Automobile-Wheels, of which the following is a specification.

My invention relates to demountable tire-carrying rim constructions for automobile wheels and has special reference to improvements in and upon demountable rims of the bolted-on type.

An object of my invention is to provide a demountable rim of more simple construction and of lower cost than any now in use; and which may be used interchangeably upon most automobile wheels now in use.

A further object of my invention is to dispense with the several parts now generally used to connect such a rim with the wheel and in place thereof substitute simple formations of the rim and wheel felly band which shall serve all the purposes of a spacer, a driver, and a valve stem container, whereby the construction of the rim may be greatly simplified while maintaining at maximum the necessary qualities of strength, durability, safety, efficiency and ease of operation.

My invention resides in the novel constructions and combinations of parts hereinafter described and more particularly pointed out in the appended claims and will be more readily understood by reference to the accompanying drawings forming a part of the specification, and in which—

Figure 1 is a side view of an automobile wheel equipped with a pneumatic tire mounted upon a demountable rim embodying my invention; Fig. 2 is an enlarged vertical and longitudinal section of the wheel, rim and tire, adjacent the valve stem; Fig. 3 is an outer side plan view of the portion of the rim which contains the valve stem hole; and Fig. 4 is a transverse vertical section of the wheel felly and rim on the line 4—4 of Fig. 2, the valve stem and spreader being omitted.

In these drawings I have shown a typical automobile wheel having a wooden felly 2 and a metal felly band 3. The latter, as shown in Fig. 4, may be provided with the usual innerside flange 4, against which the rim 5 is thrust by bolt-actuated wedge-lugs 6, of usual construction.

The invention is not limited to a felly band flanged on the inner side of the felly, nor is it limited to a construction embodying wedge fastenings for the rim. Further, my invention is not limited to the combination of the metal felly band and wooden felly, for an all-metal construction of the same general form and purpose may be substituted; and where the words "felly band" appear hereinafter they are used in this inclusive sense.

The felly band, as well shown in Figs. 2 and 3, is provided with a large valve-stem-opening 7. The outer end of the hole is usually considerably larger than the valve stem 9, while the inner end nearly fits the same; this conical shape making it easy to drop the valve stem through the wheel felly when placing the rim and tire on the wheel. Most automobile wheels of present day construction have valve holes thus proportioned to the valve stem. The demountable rim 5, as here shown, has integral flanges 5', 5' shaped to receive a straight-side pneumatic tire. In lieu of such flanges, integral clencher flanges may be used (see dotted lines Fig. 4). And one or both flanges of the rim may be detachable from the body of the rim, and not affect the operation or utility of the herein described invention. The rim may be a solid rim or may be split or cut apart on a transverse line, as shown in application Serial No. 502,069. The tire 8 is seated on the rim 5 and it is customary to keep the tire inflated thereon whether or not the rim is in position on the wheel.

To accommodate the valve stem 9 of tire 8, I provide the rim with a hole 10 somewhat larger than the valve stem 9 but smaller than the hole 7 in the wheel felly. And to provide a driver or driving conection between the rim and the wheel I form on the inner periphery of the rim a circular stud 11 which fits the hole 7. This stud is made from the stock or body of the rim itself, being an integral flange that is pressed from the rim in the process of making the valve stem hole 10. When this stud is seated in the felly band, as shown in Figs. 2 and 4 it fixes the rim upon the wheel and against rotation on the same.

Where by reason of the use of wedge-lugs or like fastening means the rim is considerably larger than the wheel, and in order that the driver 11 may be as short and as strong as possible, I strike up from the felly band a circular flange, stud or projection containing the hole 7 and fitted to the driver 11. By this means the strain is removed from the end of the driver 11 and placed at the base thereof; and furthermore, the stud $6^a$, as shown in Figs. 2 and 4 serves as a spacer between the band and rim to support the rim at the point where it is perforated.

As used in the appended claims the word "rim" means a suitably flanged, tire-carrying, demountable wheel rim.

While I have illustrated and described my invention in accordance with the patent statutes, I desire it to be understood that the details of construction may be materially varied without departing from the spirit and scope of my invention as set forth in the appended claims.

Having thus described my invention, I claim as new and desire to secure by Letters Patent:

1. A rim having an integral annular driving flange formed from its body, projecting inwardly from its inner periphery and containing a valve stem hole, in combination with a wheel felly band having a complementary integral annular driving flange projecting outwardly from its outer periphery, sized to receive and contain said annular flange of the rim and serving to space the rim away from the band.

2. A wheel having a valve stem hole in its felly, in combination with a felly band having an integral driving and rim spacing annular flange projecting outwardly from its periphery and concentric with said hole in the felly, a plurality of rim spacing and fastening devices on said wheel felly for securing a rim on said band, and a rim having a complementary integral annular driving flange formed from its body portion, projecting inwardly from its inner periphery, fitting within said driving flange of the felly band and containing a valve stem hole concentric therewith.

In testimony whereof, I have hereunto set my hand, this 5th day of March, 1914, in the presence of two subscribing witnesses.

ERLE K. BAKER.

Witnesses:
N. CURTIS LAMMOND,
JAMES S. DODGE, Jr.